United States Patent [19]

Spaziante et al.

[11] 4,214,970
[45] Jul. 29, 1980

[54] NOVEL ELECTROCATALYTIC ELECTRODES

[75] Inventors: Placido M. Spaziante, Lugano, Switzerland; Antonio Nidola, Milan, Italy

[73] Assignee: Diamond Shamrock Technologies, S.A., Geneva, Switzerland

[21] Appl. No.: 3,729

[22] Filed: Jan. 15, 1979

[51] Int. Cl.$^2$ .................. C25B 9/00; C25B 11/03; C25B 11/06; B01J 23/40

[52] U.S. Cl. .................................. 204/265; 204/284; 204/290 F; 252/471; 252/472; 252/474

[58] Field of Search ............... 252/471, 472; 204/284, 204/290 R, 290 F, 291, 292, 265–266, 277; 429/40–45

[56] References Cited

U.S. PATENT DOCUMENTS

| | | | |
|---|---|---|---|
| 2,838,462 | 6/1958 | Pease | 252/471 |
| 3,900,342 | 8/1975 | Hohne et al. | 252/471 |
| 4,049,584 | 9/1977 | Weissel | 252/472 X |

FOREIGN PATENT DOCUMENTS 2714488 10/1977 Fed. Rep. of Germany ....... 204/290 F

Primary Examiner—John H. Mack
Assistant Examiner—D. R. Valentine
Attorney, Agent, or Firm—Hammond & Littell, Weissenberger and Muserlian

[57] ABSTRACT

Novel electrodes for oxygen ionization half-cell electrode reactions comprising an electrically conductive porous base having over at least a portion thereof a coating containing an electrocatalyst comprising (1) at least one metal selected from the group consisting of silver and a platinum group metal and (2) a hydrated oxide of at least one metal selected from the group consisting of manganese and nickel, electrochemical cells containing the said electrode at which oxygen is ionized and to novel electrolytic processes with such an electrode.

18 Claims, No Drawings

NOVEL ELECTROCATALYTIC ELECTRODES

STATE OF THE ART

Oxygen ionization half-cell electrode reactions occur in different electrochemical systems such as zinc-oxygen alkaline batteries, oxygen-hydrogen fuel cells and hydrogen depolarizers in several different electrochemical reactions. The reactions require porous conductive electrodes in which it is especially important to provide a suitable catalyst. Porous conductors without catalytic activity, such as porous carbon (e.g. graphite) have been used to convert oxygen to hydroxyl ion according to the reaction $$1/2 O_2 + H_2O + 2e \rightarrow 2OH^- \tag{1}$$

but their effectiveness is often inadequate. Reaction (1) is rendered efficient, by the incorporation of an appropriate catalyst into the porous structure, especially at reasonably high current densities exceeding 10 amperes per square foot. Porous carbon without catalyst is suitable for use in applications where relatively low current densities are desired. It can also be adequate, for example, for the suppression of hydrogen evolution at a cathode. Preferably, however, the oxygen electrode, e.g., the gas electrode at which an oxygen containing gas is converted to the hydroxyl ion, comprised a conducting porous structure activated with a metal oxide of catalytic activity for reaction, such electrodes including the oxides of silver, gold, iron, magnesium, cobalt, copper and others. In many cases the oxygen (or cathode porous) electrode may contain the metal capable of forming catalytically-active oxides, and the oxide may be formed in situ by a preoxidation treatment. However, the known catalyts show a sharp increase in the electrode polarization with an increase in the current density.

U.S. Pat. No. 3,520,729 discloses a mixture of silver oxide and hydrated manganese dioxide as a positive battery electrode and U.S. Pat. No. 3,948,752 discloses a mixture of a complex of a platinum group metal oxide with a compound of the formula $Ag_xMnO_2$ where x is $0.3 \leq x \leq 0.7$ as an electrode coating.

OBJECTS OF THE INVENTION

It is an object of the invention to provide novel catalysts for oxygen ionization and novel electrodes containing the said catalyst.

It is another object of the invention to provide novel electroelectrolytic cells containing improved electrodes for oxygen ionization and to provide a novel electrolytic process using the novel oxygen electrode.

These and other objects and advantages of the invention will become obvious from the following detailed description.

THE INVENTION

The novel electrocatalysts of the invention are comprised of (A) at least one metal selected from the group consisting of silver and platinum group metals and (B) a hydrated oxide of at least one metal selected from the group consisting of manganese and nickel. The molar ratio of components A to B may vary 0.5 to 1 to 2 to 1, preferably 1:1.

The platinum group metals are platinum, palladium, ruthenium, osmium, iridium and rhodium.

The electrocatalysts of the invention have a low isoelectric point and are excellent catalysts for oxygen ionization in alkaline media and do not show any significant increase in overpotential as current density increases as do the prior art electrocatalysts such as perovskite and cobalt oxides. The electrocatalysts appear to act as a $H^+$ source in alkaline solutions by the following proposed reaction

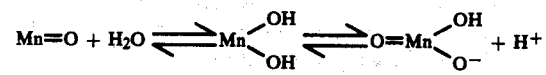

which accelerates step (2) of the following proposed electron transfer reaction.

$$O_2 + Pt \rightarrow 2Pt \ldots O \tag{1}$$

$$2Pt \ldots O + 2H_2O \rightarrow 2Pt(OH) + 2OH^- - 2e \tag{2}$$

$$2Pt(OH) \rightarrow 2Pt + 2OH^- - 2e \tag{3}$$

The electrocatalysts are therefore useful for forming electrodes in primary and secondary alkaline zinc-oxygen batteries and oxygen-hydrogen fuel cells and for anodes in electrowinning of metals from aqueous sulfuric acid solutions wherein oxygen is generated at the anode.

The novel electrodes of the invention are comprised of an electrically conductive porous substrate impregnated with an electrocatalyst consisting of (A) at least one member of the group consisting of silver and a platinum group metal and (B) a hydrated oxide of at least one metal metal selected from the group consisting of manganese and nickel. The degree of porosity of the base may vary but is preferably between 30 and 70.

The electrically conductive substrate may be made of any suitable material such as graphite or carbon strands etc but is preferably a sintered metal resistant to the electrochemical conditions in the cell such as nickel or valve metals. Examples of valve metals are tantalum, titanium, vanadium, hafnium, zirconium and tungsten. Most preferred is porous titanium.

The electrode may be formed either by electrochemical-electroless means or by electrochemical-thermal means or any other suitable means. A porous substrate may be used as a cathode to electrolyze a molten salt mixture containing hydrated metal salts such as $Mn(NO_3)_2$ and silver nitrate or a platinum group metal nitrate whereby a precipitate of metal and manganese dioxide is formed on the cathodically polarized substrate by the following reactions:

$$2H_2O \rightarrow H_2 + 2OH^- - 2e$$

$$Mn^{2+} + 2OH^- \underset{nH_2O}{\longrightarrow} [Mn(OH)_2 \cdot nH_2O]$$

$$2Ag^+ [Mn(OH)_2 \cdot nH_2O] \rightarrow [Ag_2MnO_2 \cdot nH_2O] + 2H^+$$

The second method of preparing the electrodes comprises electrolyzing a molten salt of the B component such as $Mn(NO_3)_2 \cdot H_2O$ with a porous substrate as the cathode to deposit $Mn(OH)_2$ on the cathode, applying a solution of a soluble silver or platinum group metal salt to the resulting electrode, drying the coated electrode and heating the same in air at a high enough temperature to form the electrocatalyst according to the following exemplified reaction $2Ag^+ + [Mn(OH)_2 \cdot nH_2O] \rightarrow [Ag_2MnO_2 \cdot nH_2O] + 2H^+$ An example of suitable soluble salt of the metal component A is $Ag(NH_3)_2$, and the solution is preferably an aqueous acid such as nitric acid with a pH of 0 to 2. The preferred heating range is 150° to 330° C. and the process may be repeated to build up the amount of catalyst to the desired amount, preferably 30 to 300 g/m² of projected surface of the porous substrate.

The novel electrochemical cell of the invention is comprised of a cell housing, at least one set of anodes and porous cathodes forming an electrodic gap with a diaphragm or membrane there between, means for introducing and removing anolyte from the anode chamber, means for introducing and removing catholyte from the cathode chamber, means for passing oxygen through the porous cathodes and means for impressing an electric current thereon, the improvement comprising using as the cathode an electrically conductive porous substrate containing an electrocatalyst of (A) at least one metal selected from the group consisting of silver and platinum group metals and (B) a hydrated oxide of at least one metal selected from the group consisting of nickel and manganese.

The oxygen introduced at the cathode is preferably wet or moisture containing since lower overpotentials are obtained. The amount of oxygen added will vary with the conditions under which the cell operates.

The novel electrolysis process of the invention comprises electrolyzing an electrolyte in the interelectrodic gap between an anode and an oxygen depolarized cathode, wherein said cathode is an electrically conductive porous substrate containing an electrocatalyst of (A) at least one metal selected from the group consisting of silver and platinum group metals and (B) a hydrated oxide of at least one metal selected from the group consisting of nickel and manganese.

In the following examples there are described several preferred embodiments to illustrate the invention. However, it should be understood that the invention is not intended to be limited to the specific embodiments.

EXAMPLE 1

Two porous nickel substrates were employed as cathodes in the electrolysis of molten $Mn(NO_3)_2 \cdot H_2O$ at a current density of 100 A/m² and one of the resulting electrodes was then coated with an aqueous ammoniacal solution of 14 g/l of $Pt(NH_3)_2$, was dried and heated at 330° C. for 30 minutes in a forced air oven. The latter process was repeated until the electrode had increased in weight by 50 g/m². A third electrode was formed by repeating the latter process directly with a porous nickel substrate.

The three electrodes were used as cathodes in a chlorine-oxygen depolarized cell with an anolyte containing 200 g/l of sodium chloride and a catholyte containing 150 g/l of sodium hydroxide. The cell was operated at 90° C. with a current density of 1.0 KA/m² with wet and dry oxygen. The results are reported in Table I.

TABLE I

| Catalyst | State of oxygen | Cell Voltage V |
|---|---|---|
| — | — | 3.9 |
| Pt | wet | 3.5–3.6 |
|  | dry | 3.7–3.8 |
| $MnO_2$ | wet | 3.7–3.8 |
|  | dry | 3.7–3.8 |
| $PtMnO_2 \cdot (H_2O)_n$ | wet | 3.0–3.1 |

TABLE I-continued

| Catalyst | State of oxygen | Cell Voltage V |
|---|---|---|
|  | dry | 3.0–3.1 |

The results of Table I show that the electrodes of the invention have a lower overpotential of approximately 0.6 to 0.8 volts than the electrodes with only one of the two components as the electrocatalyst.

Various modification of the apparatus and processes of the invention may be made without departing from the spirit or scope thereof and it is to be understood that the invention is to be limited only as defined in the appended claims.

What is claimed:

1. An electrocatalyst consisting of essentially of (A) at least one metal selected from the group consisting of silver and a platinum group metal and (B) a hydrated oxide of at least one metal selected from the group consisting of nickel and manganese.

2. The electrocatalyst of claim 1 wherein the molar ratio (A) to (B) is 0.5 to 2.

3. The electrocatalyst of claim 1 wherein the molar ratio (A) to (B) is 1.

4. An electrode comprising an electrically conductive porous substrate containing an electrocatalyst of (A) at least one metal selected from the group consisting of silver and platinum group metals and (B) a hydrated oxide of at least one metal selected from the group consisting of nickel and manganese.

5. The electrode of claim 4 wherein the porous substrate is sintered titanium.

6. The electrode of claim 4 wherein the electrocatalyst is platinum-hydrated manganese dioxide.

7. The electrode of claim 4 wherein the molar ratio of (A) to (B) is 0.5 to 2.

8. The electrode of claim 4 wherein the molar ratio of (A) to (B) is 1.

9. In an electrochemical cell comprised of a cell housing, at least one set of anodes and porous cathodes forming an electrodic gap with a diaphragm or membrane there between, means for introducing and removing anolyte from the anode chamber, means for introducing and removing catholyte from the cathode chamber, means for passing oxygen through the porous cathodes and means for impressing an electric current thereon, the improvement comprising using as the cathode an electrically conductive porous substrate containing an electrocatalyst of (A) at least one metal selected from the group consisting of silver and platinum group metals and (B) a hydrated oxide of at least one metal selected from the group consisting of nickel and manganese.

10. The cell of claim 9 wherein the porous substrate is sintered titanium.

11. The cell of claim 9 wherein the electrocatalyst is platinum-hydrated manganese dioxide.

12. The cell of claim 9 wherein the molar ratio of (A) to (B) is 0.5 to 2.

13. The cell of claim 9 wherein the molar ratio of (A) to (B) is 1.

14. An electrolysis process comprising electrolyzing an electrolyte in the interelectrodic gap between an anode and an oxygen depolarized cathode, the said cathode being an electrically conductive porous substrate containing an electrocatalyst of (A) at least one metal selected from the group consisting of silver and platinum group metals and (B) a hydrated oxide of at least one metal selected from the group consisting of nickel and manganese.

15. The process of claim 14 wherein the porous substrate is sintered titanium.

16. The process of claim 14 wherein the electrocatalyst is platinum-hydrated manganese dioxide.

17. The process of claim 14 wherein the molar ratio of (A) to (B) is 0.5 to 2.

18. The process of claim 14 wherein the molar ratio of (A) to (B) is 1.

* * * * *